United States Patent [19]

Harris

[11] Patent Number: 5,059,670

[45] Date of Patent: Oct. 22, 1991

[54] THERMOSETTABLE COMPOSITIONS CONTAINING ALKOXYLATED AROMATIC COMPOUNDS

[75] Inventor: Stephen H. Harris, West Chester, Pa.

[73] Assignee: Arco Chemical Technology, Inc., Wilmington, Del.

[21] Appl. No.: 515,987

[22] Filed: Apr. 27, 1990

[51] Int. Cl.$^5$ .............................................. C08G 22/16
[52] U.S. Cl. ........................................ 528/48; 528/53; 528/55; 524/712; 428/209; 428/252
[58] Field of Search ........................... 528/53, 48, 55; 428/209, 252; 260/18 TN, 30.4 N, 30.2, 32.2; 264/328.4; 524/712

[56] References Cited

U.S. PATENT DOCUMENTS

| | | | |
|---|---|---|---|
| 3,878,156 | 4/1975 | Olstowski et al. | 528/48 |
| 3,883,466 | 5/1975 | Olstowski | 528/55 |
| 3,886,102 | 5/1975 | Olstowski | 260/18 TN |
| 4,035,331 | 7/1977 | Olstowski | 524/712 |
| 4,709,002 | 11/1987 | Younes | 528/53 |
| 4,731,427 | 3/1988 | Younes | 528/53 |
| 4,757,123 | 7/1988 | Younes | 528/53 |
| 4,800,058 | 1/1989 | Younes | 528/53 |
| 4,879,164 | 11/1989 | Younes | 428/209 |
| 4,886,700 | 12/1989 | Younes | 428/252 |

*Primary Examiner*—John Kight, III
*Assistant Examiner*—Duc Truong
*Attorney, Agent, or Firm*—Stephen D. Harper

[57] ABSTRACT

Rigid polyurethane-modified polyisocyanuate compositions having improved physical properties are obtained by curing thermosettable compositions containing alkoxylated aromatic compounds, organic polyisocyanates and cyclic alkylene carbonates using an isocyanate trimerization catalyst. The use of an alkoxylated aromatic compound permits a reduction in the proportion of organic polyisocyanate required to achieve satisfactory tensile strength and stiffness. The cured compositions are useful for the production of composites as well as molded articles containing reinforcing fillers.

20 Claims, No Drawings

THERMOSETTABLE COMPOSITIONS CONTAINING ALKOXYLATED AROMATIC COMPOUNDS

FIELD OF THE INVENTION

This invention pertains to thermosettable compositions which may be cured using isocyanate trimerization catalysts to provide rigid polyurethane-modified polyisocyanurate products. The thermosettable compositions contain alkoxylated aromati compounds having an average hydroxyl functionality of at least about two and having an aromatic content of at least about 10 percent.

BACKGROUND OF THE INVENTION

Thermosettable compositions containing liquid modifying agents such as propylene carbonate and organic polyisocyanates are known to be useful in the preparation of highly rigid articles, as taught, for example, in U.S. Pat. Nos. 4,709,002, 4,757,123, and 4,879,164. Aliphatic polyether polyols may additionally be employed in compositions of this type (see, for example, U.S. Pat. Nos. 4,731,427, 4,800,058, and 4,886,700). It is preferred that the thermosettable compositions are predominantly comprised of organic polyisocyanate since the physical properties of the cured reaction product (especially stiffness and tensile strength) are significantly diminished when the proportion of liquid modifying agent or aliphatic polyether polyol is increased. However, organic polyisocyanates are relatively high in cost. It would thus be highly desirable if the isocyanate content of the thermosettable composition could be reduced without adversely affecting the physical properties of the thermoset resin.

I have now made the unexpected and surprising discovery that an alkoxylated aromatic compound having an average hydroxyl functionality of at least about two and an aromatic content of at least about 10 percent, when used in place of an aliphatic polyether polyol, yields a thermoset article having much improved tensile and flexural strength and significantly higher stiffness. The isocyanate level in the thermosettable composition can thus be advantageously lowered without sacrificing performance.

SUMMARY OF THE INVENTION

The invention provides a rigid polyurethane-modified polyisocyanurate composition which is the reaction product of a thermosettable composition comprising an alkoxylated aromatic compound having an average hydroxyl functionality of at least about two and having an aromatic content of at least about 10 percent, optionally, an aliphatic polyether polyol (provided that the total aromatic content of the alkoxylated aromatic compound and aliphatic polyether polyol combined is at least about 10 percent), an organic polyisocyanate having an average NCO functionality of at least about two, a liquid modifying agent having a boiling point at atmospheric pressure of greater than about 175° C, and an effective amount of an isocyanate trimerization catalyst. The molar ratio of isocyanate to hydroxyl in the thermosettable composition is greater than 1.5, the weight ratio of (alkoxylated aromatic compound +aliphatic polyether polyol):liquid modifying agent is from about 10:1 to 1:10, and the weight of the liquid modifying agent is from about 5 to 50 percent of the total weight of the thermosettable composition.

DETAILED DESCRIPTION OF THE INVENTION

The rigid polyurethane-modified polyisocyanurate composition of this invention is obtained by curing a thermosettable composition containing, at a minimum, an alkoxylated aromatic compound, an organic polyisocyanate and a liquid modifying agent using an isocyanate trimerization catalyst. The molar ratio of isocyanate to hydroxyl in the composition must be greater than 1.5 and more preferably is greater than 2.5. The weight ratio of alkoxylated aromatic compound to liquid modifying agent is from about 10:1 to 1:10 although it is usually desirable to employ a ratio of from about 3:1 to 1:3. The thermosettable composition contains from about 5 to 50 percent (preferably, from about 10 to 35 percent) by weight of the liquid modifying agent.

The alkoxylated aromatic compounds useful in the compositions of this invention may be any such material having an average hydroxyl functionality of at least about two and an aromatic content of at least about 10 percent. More preferably, the aromatic content is at least about 25 percent. Aromatic content, in percent, is defined herein by the following formula:

$$\frac{7700 \times \text{No. of Aromatic Rings Per Mole Alkoxylated Aromatic Compound}}{\text{Number Average Molecular Weight of Alkoxylated Aromatic Compound}}$$

The alkoxylated aromatic compound is preferably selected from the group consisting of alkoxylated phenolic compounds, alkoxylated phenol-aldehyde condensation polymers, alkoxylated aromatic glycols and aromatic polyether polyols. Such compounds may be obtained by any of the methods known in the art including the alkoxylation of a phenol, a phenol-aldehyde condensation polymer, or an aromatic glycol initiator using a cyclic ether such as an epoxide, oxetane, or oxolane. The preferred cyclic ether is a $C_2$-$C_{10}$ epoxide such as ethylene oxide, propylene oxide, 1,2-butene oxide, isobutylene oxide, epichlorohydrin, styrene oxide, phenyl glycidyl ether, cyclohexene oxide, and the like. Illustrative oxetanes and oxolanes which can be employed include 2,2-dimethyl oxetane, oxetane, 2-methyloxetane, and tetrahydrofuran. Mixtures of cyclic ethers may also be used, although propylene oxide is the preferred monomer. The cyclic ether may be reacted with the phenol, phenol-aldehyde condensation polymer, or aromatic glycol initiator using an alkoxylation catalyst such as an alkali metal compound (e.g., potassium hydroxide, lithium acetate, sodium metal, sodium hydride, potassium methoxide), a tertiary amine (e.g., triethylamine), or a double metal cyanide complex (e.g., zinc hexacyanocobaltate).

The initiator is preferably a phenolic compound having at least two aromatic hydroxyl groups such as, for example, bisphenol A, hydroquinone, catechol, dihydroxynaphthalene, pyrogallol, biphenol, resorcinol, bisphenol F, phloroglucinol, and the like. The synthesis of alkoxylated phenolic compounds is described in U.S. Pat. Nos. 4,304,682, 2,331,265, and 3,803,246 (incorporated herein by reference). Phenolic compounds having the following general structure are particularly useful as initiators:

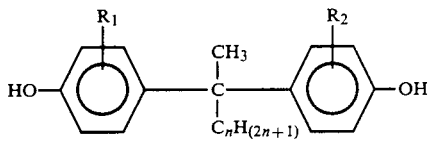

In this formula, n is 1–4 and $R_1$ and $R_2$ are independently selected from the group consisting of hydrogen and $C_1$–$C_6$ alkyl. The initiator may alternatively be a phenol-aldehyde condensation polymers of the type generally referred to as "phenolic resins", "novolac resins" or "phenoplasts", as described in *Encyclopedia of Polymer Science and Engineering*, Vol. 11, pp. 45–95 (1988). Phenol-aldehyde condensation polymers of this type can be prepared by reacting a phenol with from about 0.5 to 1.5 moles of aldehyde per mole of phenol in the presence of an acidic catalyst. Suitable methods are described, for example, in U.S. Pat. Nos. 2,838,473 and 4,046,721 (incorporated herein by reference). Also suitable for use are the phenol-aldehyde condensation polymers which are the Mannich condensation products of phenolic compounds, aldehydes, and nitrogen compounds. Such products are described in U.S. Pat. Nos. 3,297,597 and 4,137,265 (incorporated herein by reference). The preparation of alkoxylated phenol-aldehyde condensation polymers may be performed by any suitable method, including the methods disclosed in U.S. Pat. Nos. 4,137,265, 3,686,101, 3,470,118, 4,046,721, 4,500,655, 4,489,178, 4,487,852, and 3,297,597 (incorporated herein by reference).

The phenolic compound to be employed in the reaction to form the phenyl-aldehyde condensation polymer is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl, and hydroxyalkyl. The phenolic compound preferably has a molecular weight within the range of from 94 to 500. Examples of acceptable phenolic compounds include phenol, o-, m-, or p-cresols, ethylphenol, nonylphenol, p-phenylphenol, 2,2-bis(4 hydroxyphenyl)-propane, β-naphthol, β-hydroxyanthracene, p-chlorophenol, o-bromophenol, 2,6-dichlorophenol, p-nitrophenol, 4-nitro-6-phenylphenol, 2-nitro-4- methylphenol, 3,5-dimethylphenol, p-isopropylphenol, 2-bromo-4-cyclohexylphenol, 2-methyl-4 bromophenol, 2-(2-hydroxypropyl)phenol, 2-(4-hydroxphenyl)ethanol.

The preferred phenolic compounds are phenol and monoalkyl substituted phenols, especially nonylphenol.

The aldehyde to be used is most preferably formaldehyde, which may be employed in any of its conventional forms such as an aqueous formalin solution, an inhibited alcoholic solution, paraformaldehyde, or trioxane. Other aldehydes such as acetaldehyde, propionaldehyde, benzaldehyde, or butyraldehyde or mixtures of other aldehydes with formaldehyde may also be used, however.

While ammonia may also be used, the nitrogen-containing component to be reacted with the phenolic compound and formaldehyde in the Mannich condensation reaction is preferably an alkanolamine. The alkanolamine preferably has the formula:

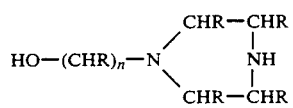

or

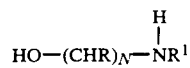

where each R is selected from hydrogen and $C_1$–$C_4$ alkyl, $R^1$ is selected from hydrogen, $C_1$–$C_4$ alkyl and —$(CHR)_4$—OH, and n is a positive integer having a value of two to five. Where the compound contains more than one —CHR— group, the nature of R may vary from group to group.

Examples of suitable alkanolamines that may be used are monoethanolamine, diethanolamine, isopropanolamine, bis(2-hydroxypropyl)amine, hydroxyethylmethyamine, N-hydroxyethylpiperazine, N-hydroxypropylpiperazine, N-hydroxybutylamine, N-hydroxyethyl-2,5-dimethylpiperazine. Secondary alkanolamines are preferred because the Mannich condensates formed from them are more readily alkoxylated to produce polyols having the desired low level of viscosity. Diethanolamine is particularly preferred. Phenol-formaldehyde condensation polymers having molecular weights of from about 200 to 2000, a hydroxyl number of 250 to 750 mg KOH/g, and an average hydroxyl functionality of at least about two are preferred.

The aromatic glycol initiator can be, for example, the hydrolysis or alcoholysis product of an aromatic epoxide [e.g., styrene oxide, phenyl glycidyl ether, or epoxy resins such as the diglycidyl ether of bisphenol A, condensation polymers of epichlorohydrin and bisphenol A, epoxy phenol novolac resins, epoxy cresol novolac resins, tetrakis(4-hydroxyphenyl)ethane tetraglyidyl ether, triglycidyl-p-aminophenol, or N,N,N'N'-tetraglycidyl-4,4,-diaminodiphenyl methane].

Suitable aromatic polyether polyols include polymers of aromatic epoxides as well as copolymers of aromatic epoxides and aliphatic epoxides having an average hydroxyl functionality of at least about two and number average molecular weights of from about 250 to 3000. Representative aromatic epoxides in this context include styrene oxide and phenyl glycidyl ether. Aliphatic epoxides having from one to six carbon atoms such as ethylene oxide, propylene oxide, 1-butene oxide, isobutylene oxide, 2-butene oxide, epichlorohydrin, 1-pentene oxide, and cyclohexene oxide are preferred if an aliphatic epoxide is employed. Preferably, the aromatic hydroxyl functionality of the alkoxylated aromatic compound is less than about 0.05. The percentage of hydroxyl groups in the alkoxylated aromatic compound which are aliphatic is desirably at least about 95 percent.

The alkoxylated aromatic compound most preferred for use in the thermosettable compositions of this invention is a propoxylated bisphenol A having an average hydroxyl functionality of about two, an aromatic hydroxyl functionality of less than about 0.05, and an aromatic content of at least about 25 percent. Preferably, the propoxylated bisphenol A has a propylene oxide:bisphenol A molar ratio of from about 2 to 10.

An organic polyisocyanate having an average NCO functionality of at least about two is also present in the thermosettable compositions of this invention. In this context, "NCO functionality" means either an isocyanate group or a "blocked" or "masked" equivalent thereof. A wide variety of organic polyisocyanates including aliphatic, alicyclic and aromatic polyisocyanates may be employed in the instant invention. Suitable organic polyisocyanates include, but are not limited to, phenylene diisocyanates, toluene diisocyanates (e.g., 2,4- or 2,6-toluene diisocyanate or mixtures thereof), methylene diphenylene diisocyanate (MDI), polymethylene polyphenylene isocyanates (PMDI), dianisidine diisocyanate, hexamethylene diisocyanates, naphthalene diisocyanates, octylene diisocyanates, diphenylpropane diisocyanates, cyclohexylene diisocyanates, hydrogenated methylene diphenylene disocyanates, triphenyl methane triisocyanates, and dicyclohexyl methane diisocyanates.

Mixtures of polyisocyanates may be used which, for example, are the crude mixtures of di- and higher functionality polyisocyanates. Such polyisocyanates, commonly referred to as crude MDI or PMDI, may be obtained by phosgenation of aniline-formaldehyde condensates or by the thermal decomposition of the corresponding carbonates as described in U.S. Pat. Nos. 3,962,302 and 3,919,279. The organic polyisocyanates may also be isocyanate-terminated prepolymers made by reacting an excess of a polyisocyanate with a diol such as polyethylene glycol, polypropylene glycol, butanediol, tripropylene glycol, triethylene glycol, polyester polyol, or the like. The isocyanates may contain impurities or additives such as carbodiimide or uretonimine modified MDI. Preferably, the organic polyisocyanate is an aromatic polyisocyanate selected from the group consisting of toluene diisocyanates, methylene diphenylene isocyanates, polymethylene polyphenylene isocyanates, carbodiimide-modified methylene diphenylene isocyanates, diolmodified methylene diphenylene isocyanates, and mixtures thereof.

The liquid modifying agent is an organic compound having a boiling point at atmospheric pressure of greater than about 175° C. which is substantially non-reactive with the other components of the thermosettable composition under the cure conditions employed. Without wishing to be bound by theory, it is believed that the liquid modifying agent functions as a reaction medium when the composition is cured. That is, the liquid modifying agent acts as a heat sink to remove the heat generated by the reaction of the isocyanate and alkoxylated aromatic compound components and enables the condensation and trimerization reactions to proceed to near completion. Without the liquid modifying agent, incomplete cure is observed and the resulting thermoset composition has very poor physical properties.

The liquid modifying agent preferably is a polar compound which has no active hydrogen-containing functional groups (e.g., hydroxyl or amino) capable of reacting with the isocyanate and may be selected from the group consisting of organic carbonates, fatty acids, carboxylic acid esters, organic phosphites, organic phosphates, organic phosphonates, cyclic ethers, dialkyl ethers of polyoxyalkylene glycols, aromatic hydrocarbons, halogenated aliphatic hydrocarbons, cyclic sulfones, and mixtures thereof.

It is preferred that the liquid modifying agent is a cyclic alkylene carbonate, preferably one having the general structure:

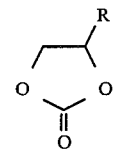

wherein R is hydrogen or a $C_1-C_{10}$ alkyl, aryl, or aralkyl group. Most preferably, the cyclic alkylene carbonate is propylene carbonate, ethylene carbonate, or a mixture of propylene carbonate and ethylene carbonate. Other alkylene carbonates such as butylene carbonate, octylene carbonate, or styrene carbonate may also be used, however.

An amount of an isocyanate trimerization catalyst effective to catalyze trimerization of the isocyanate groups of the organic polyisocyanate is also present in the thermosettable composition of this invention. Typically, the catalyst will be present in an amount of from about 0.001 to 1.0 percent by weight of the composition. Any of the known isocyanate trimerization catalysts may be employed including, for example, tertiary amines, adducts of tertiary amines and cyclic alkylene carbonates, alkali metal carboxylates, metal double alkoxides, triazines, N-hydroxy-alkyl quaternary ammonium carboxylates, quaternary ammonium hydroxides, N-substituted aziridines, and mixtures thereof. Particularly preferred for use are tertiary amines and adducts of tertiary amines and cyclic alkylene carbonates. Suitable tertiary amines include, but are not limited to, N-methyl morpholine, dimethylamino cyclohexane, N,N'-dialkylaminoalkyl phenols, triethylenediamine, bis(-dimethyl amino ethyl)ether, dimethyl ethanol amine, N,N'-dimethyl piperazine, tetrazoles, alkylene imines, trimethylamino propylethanolamine, alkoxy and amino substituted pyridines, trimethyl hydroxyethyl ethylene diamine, N,N,N',N'-tetramethyl ethylene diamine, triethylamine, pyridine, triphenylamine, and the like. Any of the cyclic alkylene carbonates usable as components of the thermosettable compositions of this invention may also be used in the carbonatetertiary amine adduct catalysts. Propylene carbonate and ethylene carbonate are preferred. To hasten the cure time of the thermosettable compositions, it is desirable that such adducts be aged for periods of from about 1 hour to 90 days as disclosed in U.S. Pat. Nos. 4,731,427, 4,886,700, 4,757,123, and 4,879,164.

Optionally, an aliphatic polyether polyol may be used in combination with the alkoxylated aromatic compound provided the total aromatic content of the "polyol" mixture (the two components combined) is at least about 10 percent. Particularly suitable aliphatic polyether polyols include those having hydroxyl equivalent weights of from about 75 to 1500. Such compounds are well known in the art and may be prepared by reacting an initiator having from 2 to 8 hydroxyl or amino groups with one or more alkylene oxides. Suitable initiators include, for example, ethylene glycol, propylene glycol, water, dipropylene glycol 1,3-propanediol, 1,2-,1,3- or 1,4-butanediol, glycerol, 1,2,6-hexanetriol, trimethylolpropane, trimethylol ethane, pentaerythriol, sorbitol, sucrose, triethanolamine, diethanolamine, ethylenediamine, amino ethanol and the like. The alkylene oxides suitable for use are preferably $C_2$-$C_6$ alkylene oxides such as ethylene oxide, propylene oxide, 1-butene oxide, 2-butene oxide, epichlorohydrin, isobutylene oxide, 1-pentene oxide, and cyclohexene oxide. The preferred aliphatic polyether polyol is polypropylene glycol having an average hydroxyl functionality of 2 or 3. Polyoxetane or polyoxetane polyols such as polytetrahydrofuran polyols or polyoxetane polyols may also be employed. Mixtures of aliphatic polyether polyols are also suitable for use in this invention.

The thermosettable compositions of this invention may additionally contain a reinforcing filler to further enhance the rigidity and strength of the final cured polyurethane-modified polyisocyanate product. Any of the reinforcing fillers known in the art may be used such as glass fibers, carbon fibers, silicon fibers, cellulosic fibers, synthetic thermoplastic fibers (e.g., nylon or "Kevlar"), or mixtures thereof. The reinforcing filler may be in powder, granular, or short or long fiber form. Chopped, woven, braided, knitted or stitched glass fibers, especially high density glass mats, are particularly useful.

Mineral fillers such as silica, calcium carbonate, talc, silicon carbide powder, carbon black and the like can also be employed. A pigment or dye may be added to the thermosettable composition to impart a desirable color to the molded article.

The thermosettable compositions of this invention may be cured into rigid polyurethane-modified polyisocyanurate compositions using any convenient method. For example, the components of the thermosettable composition can be mixed together and then reacted at a temperature of from about 10° C. to 150° C.. The reaction time can be varied as desired by changing the concentration and type of trimerization catalyst, but typically will be between about 5 seconds and 2 hours. Post-curing of the rigid polyurethane-modified polyisocyanurate composition thus obtained at an elevated temperature may also be desirable.

Some or all of the organic polyisocyanate may be pre-reacted with some or all of the alkoxylated aromatic compound or aliphatic polyether polyol to form an isocyanate prepolymer. The isocyanate prepolymer may then be combined with the other components of the thermosettable composition in order to prepare the cured resin.

In a preferred embodiment, the cured composition is formed by a reaction injection molding (RIM) technique as described in U.S. Pat. Nos. 4,731,427 and 4,709,002 and in Manzione, "Reaction Injection Molding" *Encycl. Polymer Sci. Eng.*, Vol. 14, pp 77–100 (1988) (incorporated herein by reference). This method comprises injecting at least two streams via a RIM machine into a mold cavity of desired configuration. One stream contains the organic polyisocyanate or isocyanate prepolymer while a second stream is comprised of the alkoxylated aromatic compound, the liquid modifying agent, the isocyanate trimerization catalyst, and, if desired, other components such as an aliphatic polyether polyol. Some of the liquid modifying agent may also be injected with the stream containing the organic polyisocyanate.

In another preferred embodiment, a resin transfer molding method is employed wherein the thermosettable composition is conveyed from a mixing chamber into a mold cavity of the desired configuration. The thermosettable composition is then compressed under pressure and heated at a temperature of from about 10° C. to 150° C. until hardened. The mold cavity preferably contains a reinforcing filler such as high density glass mat which becomes incorporated into the cured polyurethane-modified polyisocyanate composition. Such methods are described, for example, in U.S. Pat. No. 4,757,123 and in *Plastics Engineering Handbook*, 4th Ed., pp. 220–240 (incorporated herein by reference).

Laminated composites containing at least one layer of the cured polyurethane-modified polyisocyanurate composition and at least one layer of a material such as metal, plastic, cellulose, glass, or ceramic may also be prepared using the thermosettable compositions of this invention. Such laminated composites may be formed by the methods described in U.S. Pat. Nos. 4,879,164 and 4,886,700 (incorporated herein by reference). Metalized (metal clad) laminated composites are useful as printed circuit board components, for example.

Without further elaboration, it is believed that one skilled in the art can, using the preceding description, utilize the present invention to its fullest extent. The following examples, therefore, are to be considered as merely illustrative and not limitative of the claims or remainder of the disclosure in any way whatsoever.

EXAMPLE 1

An alkoxylated aromatic compound prepared by the potassium hydroxide-catalyzed reaction of propylene oxide and bisphenol A, was diluted with an equal weight of anhydrous propylene carbonate. The alkoxylated aromatic compound had a number average molecular weight of 400 (as determined by hydroxy end group analysis) and an aromatic content of 39%. A thermosettable composition was prepared by mixing 20 parts by weight of the alkoxylated aromatic compound/propylene carbonate solution, an additional 10 parts by weight anhydrous propylene carbonate, and 0.005 parts by weight diazabicyclooctane catalyst and then combining this mixture with 70 parts by weight "Rubinate LF-168" (a carbodiimide-modified liquid MDI available from ICI). The resulting composition was poured between two aluminum plates, allowed to cure 15 minutes at room temperature, and then cured 1 hour at 80° C.. The overall weight percent alkoxylated aromatic compound in the final cured article was 10%. The physical properties of the plaque thus prepared are shown in Table I.

COMPARATIVE EXAMPLE 2

A thermosettable composition identical to that described in Example 1 was prepared using a 400 molecular weight polypropylene glycol in place of the alkoxylated aromatic compound. The cured plaque obtained from this composition was significantly inferior in tensile strength, flexural strength, and flexural modulus to the product of Example 1 (Table I).

EXAMPLE 3

A plaque was prepared using 20 parts by weight of the alkoxylated aromatic compound of Example 1, 20 parts by weight propylene carbonate, 0.005 parts by weight of diazabicyclooctane, and 60 parts by weight "Rubinate LF-168". Surprisingly, the tensile strength, flexural strength, flexural modulus, and elongation were improved over the composition of Example 1 even though the proportion of isocyanate employed was lower (Table I). This result was unexpected since decreased isocyanate content in polyisocyanurate compositions of this type typically results in poorer physical properties.

EXAMPLES 4-6

These examples (Table II) demonstrate the effect of increasing the proportion of alkoxylated aromatic compound in the thermosettable compositions of this invention. The compositions contained 60 parts by weight "Mondur-MR" (a polymethylene polyphenylene isocyanate available from Mobay Chemical Corporation), 20 parts by weight propylene carbonate, 20 parts by weight "polyol", and 0.02 parts by weight diazabicyclooctane (catalyst). In Comparative Example 4, the "polyol" employed was "Thanol SF-700" (a polypropylene glycol triol having a number average molecular weight of 700, available from ARCO Chemical Company). In Example 6, the alkoxylated aromatic polyol of Example 1 was employed. A 50/50 mixture of "Thanol SF-700" and the alkoxylated aromatic polyol of Example 1 was used in Example 5 (the aromatic content of this polyol mixture was 19.5%).

The isocyanate was mixed with the remainder of the components and the resulting mixture quickly poured into a mold. A set time of about 20 seconds was observed in each case. After about 15 minutes at ambient temperature, the plaques were post-cured at 80° C. for 1 hour.

Table II shows that the stiffness and strength of the cured composition increased markedly as the proportion of alkoxylated aromatic compound in the composition was increased. Surprisingly, the impact resistance also improved significantly.

EXAMPLES 7-9

Examples 4-6 were repeated using the following proportions: 50 parts by weight "Mondur-MR", 25 parts by weight propylene carbonate, 25 parts by weight "polyol", and 0.02 parts by weight diazabicyclooctane. As in the previous examples, replacing all or part of the aliphatic polyether polyol with an alkoxylated aromatic compound led to pronounced improvement in tensile strength, flexural strength, flexural modulus, and impact strength.

EXAMPLE 10

An alkoxylated aromatic compound prepared by the potassium hydroxide catalyzed reaction of propylene oxide and bisphenol A was diluted with an equal weight of anhydrous propylene carbonate. The alkoxylated aromatic compound had a number average molecular weight of 600 (as determined by hydroxy end group analysis), an average hydroxyl functionality of about two, and an aromatic content of 25.6%. The mixture (40 parts by weight) was mixed using slight heating with 0.005 parts by weight diazabicyclooctane. "Mondur MF-182" (60 parts by weight; a polymeric isocyanate available from Mobay Chemical Corporation) was combined quickly with the catalyzed propylene carbonate mixture and cured in a mold for 15 minutes at room temperature. The plaque was then post-cured at 80° C. for 1 hour.

COMPARATIVE EXAMPLE 11

The procedure of Example 10 was repeated using 20 parts by weight polypropylene glycol diol (600 number average molecular weight) in place of the alkoxylated aromatic compound. Table IV shows that the physical properties of the plaque obtained are generally inferior to those obtained in Example 10 using an alkoxylated aromatic compound of similar molecular weight.

EXAMPLE 12

This example demonstrates the use of a propoxylated phenol-formaldehyde-diethanolamine condensation polymer in the thermosettable compositions of this invention.

A three liter flask is charged with 564 grams (6 mole) of phenol and 1260 g (12 mole) of diethanolamine. To this mixture is added with agitation 974 g (12 mole) of a 37% formaldehyde solution while maintaining a temperature of about 25° C.. After formaldehyde addition, the reaction mixture is agitated overnight at room temperature and then heated to 90° C. for about 2 to 5 hours. Water is then removed from the product by vacuum stripping at 100° C. and 0.25 mm pressure, leaving about 1970 g of a viscous oil. Of this material, 1770 g (5.41 mole) is heated to 90° C. and 870 g (15.0 mole) propylene oxide is added over about 4 hours. After addition is complete, the reaction mixture is digested at 90° C. for about 1 hour and then vacuum stripped. The propoxylated phenol-formaldehyde-diethanolamine condensation polymer thus produced has a number average weight of about 490, an aromatic content of about 15.7%, an average hydroxyl functionality of about 5.3, and a hydroxyl number of about 605 mg KOH/g.

The following formulation is reaction injection molded on a Martin Sweets "Fleximatic HP-206" RIM machine into an 8"×8"×⅛" aluminum mold having a woven glass mat placed in it. The woven glass mat represents about 40% by weight of the final cured composition. The isocyanate:hydroxyl molar ratio in the thermosettable composition is about 3.0.

| Component A | | Component B | |
|---|---|---|---|
| | pbw | | pbw |
| Methylene Diphenylene Diisocyanate (MDI) | 202.8 | Propylene Carbonate | 25 |
| | | Butylene Carbonate | 25 |
| | | Propoxylated Phenol-Formaldehyde-Diethanolamine Condensation Product | 50 |
| | | Catalyst* | 1.5 |

*1,4,5,8-tetramethyl hexahydropyrazino [2,3-b] pyrazine (U.S. Pat. No. 3,759,916)

The formed polyurethane modified polyisocyanurate is then demolded and post cured for 2 hours at 120° C.

EXAMPLE 13

This example illustrates the use of an alkoxylated phenolformaldehyde condensation product in a polyurethane modified polyisocyanurate composition.

A novolac resin is prepared in accordance with Example 1-A of U.S. Pat. No. 3,686,101. The product has a number average molecular weight of about 400 and corresponds to the general formula:

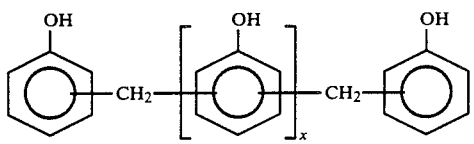

wherein x has an average value of about 1.89. The novolac resin (1000 g; 2.5 mole) is then alkoxylated by adding 3 g trimethyl amine catalyst, heating to a temperature of about 150° C., and adding a mixture of ethylene oxide (440 g; 10 mole) and 1,2-butene oxide (1440 g; 20 mole) over a period of about 6 hours. After digesting about 3 hours at 150° C., the reaction mixture is stirred and heated under vacuum at a temperature of about 160° C. for a period of about 3 hours to remove volatiles. The alkoxylated phenol-formaldehyde condensation product thus obtained has a number average molecular weight of about 1150, an aromatic content of about 26%, and a hydroxyl number of about 475 mg KOH/g.

Toluene diisocyanate (62.5 g of an 80/20 mixture of 2,4 and 2,6 isomers; 0.36 mole), propylene carbonate (50 g), dioctylphthalate (16 g), the alkoxylated phenol-formaldehyde condensation product (34 g; 0.030 moles); and a soluble triethylene diamine-propylene carbonate adduct prepared in accordance with Example 1 of U.S. Pat. No. 4,800,058 (2.2 g) are mixed at room temperature and poured into a 6.5"×9.5"×0.1" brass mold containing one 3 oz. layer and one 1.5 oz layer of glass fiber mats (Owens Corning M8610) to fill the mold. The weight of the glass mats is about 36% of the total weight of the cured composition. The mold is placed in a preheated (82° C.) hydraulic press and allowed to react and cure for 30 minutes under 450 psi pressure. The glass reinforced plaque thus prepared is demolded 10 minutes after removing the mold from the press.

TABLE I

| EXAMPLE | 1 | 2* | 3 |
|---|---|---|---|
| Aromatic Content | | | |
| "Polyol" Component, % | 39 | 0 | 39 |
| Overall Composition, % | 3.9 | 0 | 7.8 |
| Tensile Strength (psi) | 10,300 | 8750 | 11,100 |
| Flexural Strength (psi) | 16,000 | 13,100 | 16,700 |
| Flex. Modulus ($\times 10^{-3}$ psi) | 420 | 360 | 440 |
| Elongation, % | 6.0 | 6.0 | 7.5 |

*Comparative example

TABLE II

| EXAMPLE | 4* | 5 | 6 |
|---|---|---|---|
| Aromatic Content | | | |
| "Polyol" Component, % | 0 | 19.5 | 39 |
| Overall Composition, % | 0 | 3.9 | 7.8 |
| Tensile Strength (psi) | 5900 | 6000 | 7000 |
| Flexural Strength (psi) | 10,800 | 10,700 | 14,400[1] |
| Flex. Modulus ($\times 10^{-3}$ psi) | 340 | 360 | 420 |
| Elongation, % | 4.9 | 2.7 | 5.4 |
| Izod Impact (foot pounds) | 2.2 | 2.4 | 3.5 |

[1]No break
*Comparative example

TABLE III

| EXAMPLE | 7* | 8 | 9 |
|---|---|---|---|
| Aromatic Content | | | |
| "Polyol" Component, % | 0 | 19.5 | 39 |
| Overall Composition, % | 0 | 4.9 | 9.8 |
| Tensile Strength (psi) | 3100 | 5000 | 6100 |
| Flexural Strength (psi) | 5900 | 9000 | 11,400 |
| Flexural Modulus ($\times 10^{-3}$ psi) | 180 | 290 | 340 |
| Elongation, % | 6.2 | 5.7 | 4.4 |
| Izod Impact (foot pounds) | 2.5 | 3.3 | 4.0 |

*Comparative example

TABLE IV

| EXAMPLE | 10 | 11* |
|---|---|---|
| Aromatic Content | | |
| "Polyol" Component, % | 25.6 | 0 |
| Overall Composition, % | 6.4 | 0 |
| Tensile Strength (psi) | 6340 | 4296 |
| Tensile Modulus ($\times 10^{-3}$ psi) | 371 | 235 |
| Flexural Strength (psi) | 14,207 | 9134 |
| Flexural Modulus ($\times 10^{-3}$ psi) | 425 | 286 |
| Elongation, % | 2.36 | 2.52 |

*Comparative example

I claim:

1. A rigid polyurethane-modified polyisocyanurate composition which is the reaction product of a thermosettable composition comprising:
   A. an alkoxylated aromatic compound having an average hydroxyl functionality of at least about two and having an aromatic content of at least about 10 percent;
   B. optionally, a first aliphatic polyether polyol, provided that the total aromatic content of A and B combined is at least about 10 percent;
   C. an organic polyisocyanate having an average NCO functionality of at least about two;
   D. a liquid modifying agent having a boiling point at atmospheric pressure of at least about 175° C. which is substantially non-reactive with the organic polyisocyanate; and
   E. an effective amount of an isocyanate trimerization catalyst;
   wherein the molar ratio of isocyanate to hydroxy lin the composition is greater than 1.5, the weight ratio of (A+B):D is from about 10:1 to 1:10, the weight of D is from about 5 to 50 percent of the total weight of the thermosettable composition, and the total aromatic content of A and B combined is effective to increase the flexural strength, tensile strength, and flexural modulus of the polyisocyanurate composition as compared to the same polyisocyanurate composition prepared using a second aliphatic polyether polyol having the same hydroxyl equivalent weight in place of the alkoxylated aromatic compound.

2. The composition of claim 1 wherein the alkoxylated aromatic compound is selected from the group consisting of alkoxylated phenolic compounds, alkoxylated phenol-formaldehyde condensation polymers, and alkoxylated aromatic glycols.

3. The composition of claim 1 wherein the aromatic content of the alkoxylated aromatic compound is at least about 25 percent.

4. The composition of claim 1 wherein the first aliphatic polyether polyol is an adduct of an aliphatic polyhydroxy initiator having from 2 to 8 hydroxyl groups and a $C_2$–$C_4$ aliphatic epoxide having a hydroxyl equivalent weight of from about 75 to 1500.

5. The composition of claim 1 wherein the organic polyisocyanate is an aromatic polyisocyanate.

6. The composition of claim 1 wherein the liquid modifying agent is a cyclic alkylene carbonate having the general formula

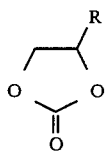

wherein R is hydrogen or a $C_1$-$C_{10}$ alkyl, aryl, or aralkyl group.

7. The composition of claim 1 wherein the isocyanate trimerization catalyst is selected from the group consisting of tertiary amines, adducts of tertiary amines and cyclic alkylene carbonates, alkali metal carboxylates, triazines, N-hydroxy-alkyl quaternary ammonium carboxylates, N-substituted aziridines, and mixtures thereof.

8. The composition of claim 1 wherein the isocyanate trimerization catalyst is present in an amount of from about 0.001 to 1.0 percent by weight of the composition.

9. The composition of claim 1 wherein the molar ratio of isocyanate to hydroxyl in the thermosettable composition is greater than 2.5.

10. The composition of claim 1 wherein the weight ratio of (A+B):D is from about 3:1 to 1:3.

11. The composition of claim 1 wherein the weight of D is from about 10 to 35 percent of the total weight of the thermosettable composition.

12. A rigid polyurethane-modified polyisocyanurate composition which is the reaction product of a thermosettable composition comprising
   A. an alkoxylated pheolic compound having an average aliphatic hydroxyl functionality of at least about two, an aromatic hydroxyl functionality of less than about 0.05, and an aromatic content of at least about 25 percent;
   B. optionally, a first aliphatic polyether polyol, provided that the total aromatic content of A and B combined is at least about 15 percent;
   C. an organic polyisocyanate selected from the group consisting of toluene diisocyanates, methylene diphenylene isocyanates, polymethylene polyphenylene isocyanates, carbodimide-modified methylene diphenylene isocyanates, diol-modified methylene diphenylene isocyanates, and mixtures thereof;
   D. a cyclic alkylene carbonate selected from the group consisting of propylene carbonate, ethylene carbonate, and mixtures thereof;
   E. an isocyanate trimerization catalyst selected from the group consisting of soluble adducts of a tertiary amine and the cyclic alkylene carbonate and tertiary amines;
wherein the molar ratio of isocyanate to hydroxyl in the thermosettable composition is greater than 2.5, the weight ratio of (A+B):D is from about 3:1 to 1:3, the weight of D is from about 10 to 30 percent of the total weight of the thermosettable composition, the weight of E is from about 0.001 to 1.0 percent of the total weight of the thermosettable composition, and the total aromatic content of A and B combined is effective to increase the flexural strength, tensile strength, and flexural modulus of the polyisocyanurate composition as compared to the same polyisocyanurate composition prepared using a second aliphatic polyether polyol having the same hydroxyl equivalent weight in place of the alkoxylated phenolic compound.

13. The composition of claim 12 wherein the alkoxylated phenolic compound is a $C_2$-$C_4$ epoxide adduct of a phenolic compound selected from the group consisting of biphenol A, halogenated bisphenol A, hydroquinone, catechol, resorcinol, bisphenol F, and mixtures thereof.

14. The composition of claim 13 wherein the $C_2$-$C_4$ epoxide is propylene oxide.

15. The composition of claim 12 wherein the first aliphatic polyether polyol is an epoxide adduct of an aliphatic polyhydroxy initiator having a hydroxyl equivalent weight of from about 75 to 1500.

16. The composition of claim 12 wherein the cyclic alkylene carbonate is propylene carbonate.

17. The composition of claim 12 additionally comprising a reinforcing filler.

18. The composition of claim 17 wherein the reinforcing filler is selected from the group consisting of glass fibers, carbon fibers, silicon fibers, cellulosic fibers, synthetic thermoplastic fibers, or mixtures thereof.

19. A rigid polyurethane-modified polyisocyanurate composition which is the reaction product of a thermosettable composition comprising:
   A. a propoxylated bisphenol A having an average hydroxyl functionality of at least about two, an aromatic hydroxyl functionality of less than about 0.05, and an aromatic content of at least about 25 percent;
   B. optionally, a first polypropylene glycol, provided that the total aromatic content of A and B combined is at least about 15 percent;
   C. an organic polyisocyanate selected from the group consisting of toluene diisocyanates, methylene diphenylene isocyanates, polymethylene polyphenylene isocyanates, carbodimide-modified methylene diphenylene isocyanates, diol-modified methylene diphenylene isocyanates, and mixtures thereof;
   D. a cyclic alkylene carbonate selected from the group consisting of propylene carbonate, ethylene carbonate, and mixtures thereof;
   E. an isocyanate trimerization catalyst selected from the group consisting of soluble adducts of a tertiary amine and the cyclic alkylene carbonate and tertiary amines;
wherein the molar ratio of isocyanate to hydroxyl in the thermosettable composition is greater than 2.5, the weight ratio of (A+B):D is from about 3:1 to 1:3, the weight of D is from about 10 to 30 percent of the total weight of the thermosettable composition, the weight of E is from about 0.001 to 1.0 percent of the total weight of the thermosettable composition, and the total aromatic content of A and B combined is effective to increase the flexural strength, tensile strength, and flexural modulus of the polyisocyanurate composition as compared to the same polyisocyanurate composition prepared using a second aliphatic polyether polyol having the same hydroxyl equivalent weight in place of the alkoxylated phenolic compound.

20. The composition of claim 19 additionally comprising a reinforcing filler selected from the group consisting of glass fibers, carbon fibers, silicon fibers, cellulosic fibers, synthetic thermoplastic fibers, or mixtures thereof.

* * * * *